United States Patent [19]

Boivin

[11] 3,933,188

[45] Jan. 20, 1976

[54] ROOT SHEAR FELLER

[75] Inventor: Joseph J. R. Boivin, Montreal, Canada

[73] Assignee: Logging Development Corporation, Montreal, Canada

[22] Filed: July 26, 1974

[21] Appl. No.: 491,993

[30] Foreign Application Priority Data
Aug. 2, 1973  Canada ............................. 178004

[52] U.S. Cl. ........ 144/34 R; 144/2 Z; 144/309 AC; 294/106
[51] Int. Cl.²......................................... A01G 23/08
[58] Field of Search .......... 144/2 N, 2 Z, 3 D, 34 R, 144/34 E, 309 AC; 294/106

[56] References Cited
UNITED STATES PATENTS

| | | | |
|---|---|---|---|
| 3,363,929 | 1/1968 | Nelson .............................. | 294/106 X |
| 3,536,113 | 10/1970 | Sutherland ................... | 144/309 AC |
| 3,631,995 | 1/1972 | Jones .............................. | 294/106 X |
| 3,738,401 | 6/1973 | Wiklund et al ........... | 144/309 AC X |
| 3,763,905 | 10/1973 | Hamilton et al. ........ | 144/309 AC X |
| 3,797,539 | 3/1974 | Moser et al. ..................... | 144/2 Z X |
| 3,822,730 | 7/1974 | Hultdin et al. ................ | 144/34 R X |
| 3,851,686 | 12/1974 | Hultdin et al. ................ | 144/34 E X |

*Primary Examiner*—Travis S. McGee
*Assistant Examiner*—W. D. Bray
*Attorney, Agent, or Firm*—Stanley E. Johnson

[57] ABSTRACT

An apparatus for severing the root system of a tree from the tree trunk during tree felling comprising a grapple mechanism for gripping the tree which, in operation, is clamped to the tree trunk and a cutting part suspended from the gripping mechanism for cutting the roots. The cutting part includes cutting knives arranged to encompass the tree trunk and movably mounted relative to the gripping part for cutting the roots. The power mechanism interconnecting the tree gripping mechanism and the tree cutting part moves the latter relative to the gripping mechanism in a direction longitudinally of the tree during a severing operation. The device may also be used to sever limbs from trees.

19 Claims, 4 Drawing Figures

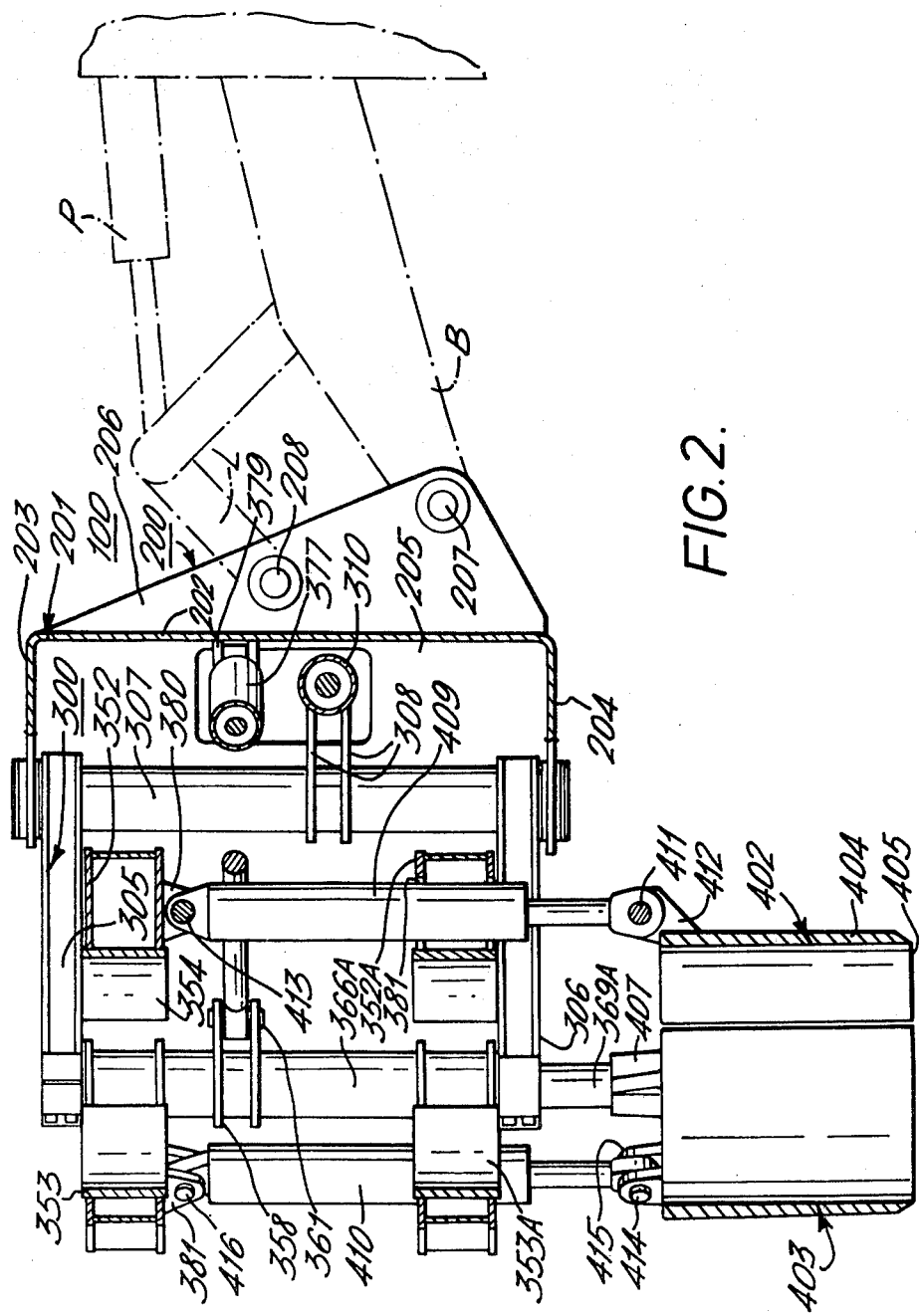

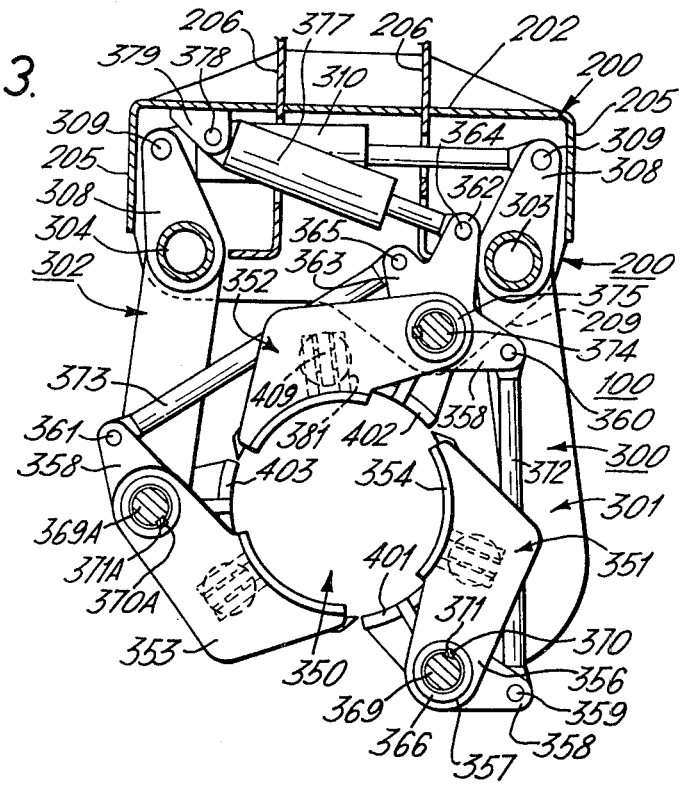
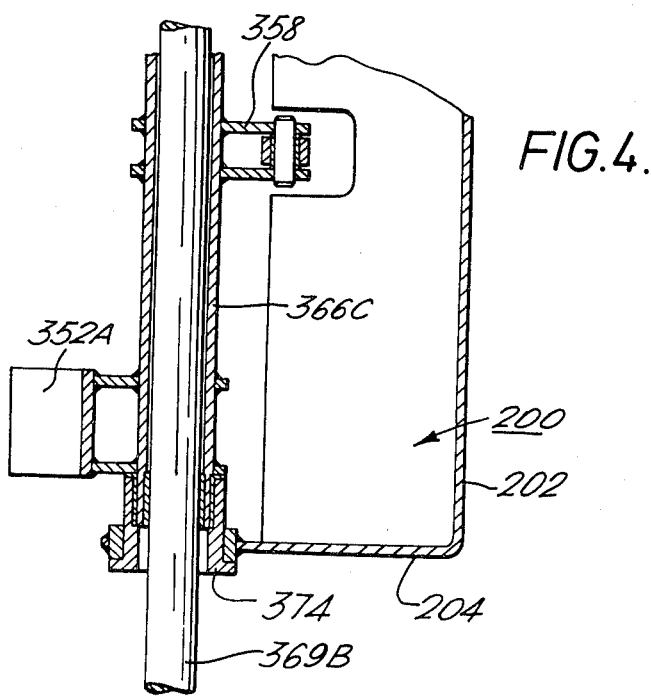

ROOT SHEAR FELLER

This invention relates to a method and an apparatus for severing the root system of a tree from the tree trunk during a tree falling operation. The apparatus comprises a grapple assembly mounted on a frame and a tree root severing mechanism suspended from the grapple assembly and movable relative thereto by a power actuated mechanism.

The principal object of the present invention is to provide an improved tree root severing mechanism of the foregoing type and which is accomplished by mounting at least some of the cutting members on the grapple mechanism for movement therewith during opening and closing of the grapple jaw.

A tree root severing mechanism of the general type is disclosed in U.S. Pat. No. 3,738,401 issued June 12, 1973 to Martin Wiklund et al entitled "Apparatus for Severing the Root System of the Tree From the Trunk during the Tree-Felling Operation". In the patented arrangement, there is provided a tree grapple mechanism mounted on a frame and having a tree severing mechanism suspended from the frame on which the grapple is mounted and located vertically below the grapple in a tree felling operation. The present device is an improvement thereover having the tree severing mechanism suspended from the grapple mechanism rather than the frame of the grapple as in the patented device.

Accordingly there is provided in accordance with the present invention a tree cutting device comprising in combination a frame, a grapple comprising arms movably mounted on said frame for positively gripping a longitudinally extending object such as a tree and cutting members movably mounted on said grapple in spaced relation relative thereto for movement in a direction toward and away therefrom longitudinally along the object grasped by the grapple, said cutting member having a cutting edge facing in a direction away from said grapple and at least one of said cutting members being connected to a movable arm of the grapple for movement in unison therewith during opening and closing of the grapple jaw to respectively receive and grasp the stem of a tree.

The invention is illustrated by way of example with reference to the accompanying drawings wherein:

FIG. 2 is a vertical side elevational view taken substantially along section 2—2 of FIG. 1;

FIG. 3 is a top partial sectional view taken along section 3—3 of FIG. 1; and

FIG. 4 is a partial sectional view illustrating details of the mounting of one set of grapple gripping members on the frame.

Figure 1:
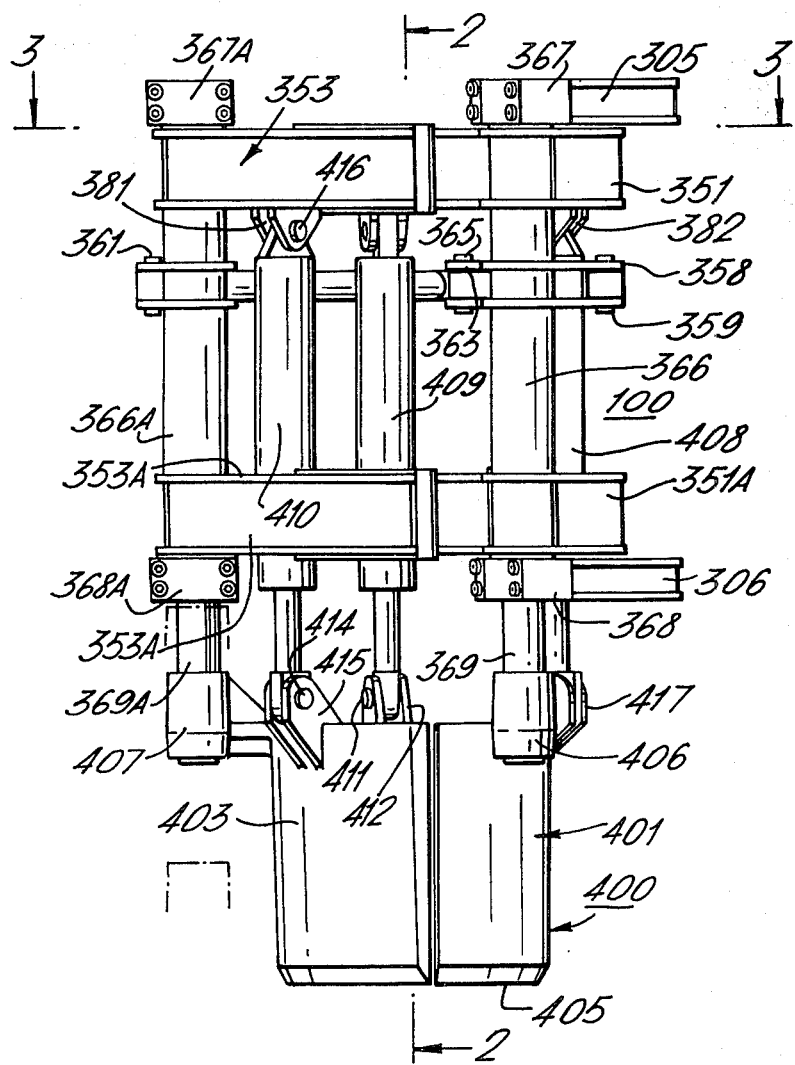
FIG. 1 is front elevational view of a felling head constructed in accordance with the present invention.

Referring now in detail to the drawings, shown therein is a felling head 100 consisting of a frame 200 having a grapple assembly 300 mounted thereon and a tree root severing mechanism 400 suspended from the grapple mechanism 300.

The frame 200 is a box-like assembly 201 having a rear wall 202, respective top and bottom walls 203 and 204 and opposite side walls 205. The box assembly is open at the front and rear wall 202 and has a pair of mounting brackets 206 spaced apart from one another with aligned apertures 207 to receive a pivot pin serving as a pivotal attachment to boom B or component of a boom. A further pair of aligned apertures 208, in bracket members 206, are provided to receive a further pivot pin for connecting a power actuated hydraulic cylinder assembly thereto by a linkage L to pivot the felling head assembly about a pivot pin in apertures 207.

The grapple mechanism consists of a pair of jaw members 301 and 302 pivotally mounted on the box frame 200 respectively by pivot pins 303 and 304. Each jaw member 301 and 302 has respectively an upper bar member 305 and 306. The upper and lower bars 305 and 306 of the respective jaw member are interconnected by a sleeve 307 and pivot as an integral unit about their respective pivot pins 303 and 304. Each sleeve 307 is provided with a pair of bracket bar members 308 secured to the sleeve and projecting therefrom into the box member 200. The free end of each bracket member 308 is provided with an aperture for receiving a pivot pin 309. A hydraulic cylinder assembly 310 is connected respectively at opposite ends by pivot pins 309 to the respective jaw members 301 and 302. Actuation of the hydraulic cylinder assembly 310 to extend and retract the same pivotally moves the respective jaws 301 and 302 about their pivot pins 303 and 304 to open and close the jaw of the grapple.

The grapple 300 further includes a plurality of gripping members circumscribing a central area designated generally 350. There are three pairs of gripping members, the upper one of the respective pairs being designated respectively 351, 352 and 353 and which are clearly seen in FIG. 3. Each gripping member 351, 352 and 353 has an arcuate tree engaging inner surface 354 consisting of a plate having a smooth, spiked or otherwise arranged surface for suitable gripping the surface of a tree trunk. The lower set of gripping members designated 351A, 352A and 353A are mounted for unitary movement with respective gripping members 351, 352, and 353. The upper and lower pairs of gripping members are identical and, accordingly only the upper set will be described, the bottom differing only in that an aperture is provided in each of the respective members allowing a hydraulic cylinder assembly to pass therethrough and the purpose of which will become clear hereinafter. Each gripping member 351, 352 and 353 has an arm portion 356 apertured at 357 to receive a sleeve and which is secured to the arm by welding or the like. Each gripping member 351, 352 and 353 is further provided with an arm portion 358 apertured to receive respective pins 359, 360 and 361. Gripping member 352 is further provided with a pair of arms designated respectively 362 and 363 apertured to receive respective pivot pins 364 and 365.

The upper gripping member 351 and corresponding lower gripping member 351A are interconnected by a sleeve 366 journalled for rotation at respective opposite ends in bearing members 367 and 368. The respective bearing members 367 and 368 are secured to the free end of respective arms 305 and 306 of the jaw member 301. The respective upper and lower gripping members 351 and 351A are secured to the sleeve 366 to rotate therewith through actuation of a hydraulic cylinder and linkage mechanism to be described hereinafter. A shaft 369 is slidably mounted for longitudinal movement in a telescopic fashion within the sleeve 366, the lower end of the shaft 369 projecting downwardly from the gripping members and jaw for a purpose which will become apparent hereinafter. The shaft 369 has a longitudinally extending, square in cross-section, key 370 secured thereto slidably arranged in a longitudinal groove 371 in the internal surface of the sleeve. The key 370 causes shaft 369 to rotate with sleeve 366 during rotation thereof in its respective upper and lower journals 367 and 368.

Gripping members 353 and 353A are similarly pivotally mounted on the free end of arm 302. The gripping members 353 and 353A are secured to a sleeve 366A journalled in respective upper and lower bearings 367A and 368A. A shaft 369A is slidably arranged in the sleeve 366A and connected thereto for rotation therewith by a longitudinally extending key 370A slidably arranged in a longitudinally extending groove 371A in the inner surface of the sleeve 366A.

From the foregoing it will be clear that a pair of upper and lower gripping members are mounted on respective sleeves 366 and 366A which in turn are journalled for rotation on respective ones of the grapple jaw members 301 and 302. The upper and lower gripping members 351 and 351A on jaw member 301 and the upper and lower gripping members 353 and 353A on grapple jaw member 302 are rotatable on the respective jaw members and synchronized in pivotal movement by link members 372 and 373. Link member 372 is connected at one end by pivot pin 359 to the bracket projecting from sleeve 366 and at the other end pivotally connected by the pivot pin 360 to bracket member 358 mounted for rotation with gripping member 352. Link member 373 is pivotally connected at opposite ends by respective pins 361 and 365 to brackets 358 of respective gripping members 353 and 352.

Upper and lower gripping members 352 and 352A are mounted on a sleeve 366C journalled for rotation on the respective upper and lower walls 203 and 204 of the box frame 200. For this purpose, the upper and lower walls 203 and 204 have a forwardly projecting portion 209, one of which is illustrated in phantom in FIG. 3. The sleeve 366C of gripping members 352 and 352A is journalled for rotation in the walls 202 and 204 by journals 374. One journal 374 is shown in FIG. 4 and is essentially the same as journals 368, 368A, 367 and 367A. A shaft 369B is slidably mounted in sleeve 366C in the same manner as previously described shafts 369 and 369A. The sleeve 366C has the bracket member 358 rigidly secured thereto and in which respective pivot pins 360, 364 and 365 are mounted. A hydraulic cylinder assembly 377 is pivotally connected at one end by pivot pin 364 to the bracket 358 and, at the opposite end, by a pivot pin 378 to the rear wall 202 of the frame by a bracket 379. Through actuation of the hydraulic cylinder 377 the gripping members are pivoted about their respective pivotal mountings opening and closing as an iris about the central opening 350. The gripping face 354 of the respective gripping members are spaced apart circumferentially from one another about the opening 350 allowing for movement toward and away from one another to grip trees of various sizes.

The cutting device 400 is suspended from, and located vertically below, the grapple mechanism 300. The cutting device 400 consists of cutting members 401, 402 and 403. Each cutting member 401, 402 and 403 has an arcuate plate 404 terminating at the lower end in a cutting edge 405. The arcuate plates extend longitudinally of the axis of the central area 350 and the respective cutting edges 405 are located at a position remote from the grapple mechanism device 300. Cutting members 401 and 403 are secured to the lower end of respective shafts 369 and 369A by respective brackets 406 and 407. Cutting member 402 is similarly suspended from shaft 369B in the same manner. The shafts 369, 369A and 369B, being longitudinally movable in their respective sleeve members, permit moving the cutting members vertically as viewed in FIG. 1 relative to the grapple mechanism 300. Such movement of the respective cutting devices 401, 402, 403 longitudinally of the axis of area 350, is effected by respective hydraulic cylinders 408, 409 and 410. Hydraulic cylinder assembly 409 is pivotally connected at one end by a pin 411 to a bracket 412 on the cutting member 402. The opposite end of the hydraulic cylinder is pivotally connected by a pin 413 to the lower part of the upper gripping member 352 by a bracket 380. The lower gripping member 352A has an aperture 381 through which the hydraulic cylinder assembly 409 passes.

The hydraulic cylinder assembly 410 similarly is connected at one end by a pivot pin 414 to a bracket 415 on the cutting member 403. The opposite end of the hydraulic cylinder assembly 410 is pivotally connected by a pivot pin 416 to the upper gripping member 353 by a bracket 381.

Hydraulic cylinder assembly 408 is similarly connected at one end by a pivot pin to cutting member 401 by a bracket 417 and at the opposite end by a bracket 382 to the upper gripping member 351.

By the foregoing arrangement the respective cutting members 401 and 403 are pivotally suspended from the free end of respective jaw members 301 and 302 and located at a position vertically therebelow. The orientation of the cutting members 401 and 403 about the central opening 350 corresponds to the respective gripping members 351 and 353 which, as previously seen, each consists of an upper and a lower member. The cutting member 402 depends from the frame 200 on shaft 369B and is located about the central opening 350 vertically below the gripping members 352 and 352A. The cutting members 401 and 403 accordingly are movable toward and away from one another by movement of the respective arms 301 and 302. Movement of the pairs of gripping members 351, 351A and 353, 353A is further provided by their pivotal mounting on the respective arms 301 and 302 and which pivotal movement, as previously described, is controlled through actuation of hydraulic cylinder assembly 377. Movement of the arms 301 and 302 is effected through actuation of hydraulic cylinder 310. Through this arrangement the cutting members 401 and 403 move simultaneously with the respective gripping members associated therewith by movement of arms 301 and 302 and further they move simultaneously with pivoting the respective gripping members associated therewith on the arms.

Cutting member 402 pivotally moves in synchronism with the pairs of gripping members on the respective arms through linkages 372 and 373.

In operation of the device described in the foregoing to fell trees, the entire assembly is pivotally attached to the free end of an extendible and retractable boom B by a pivot pin and controllably pivoted thereabout by a hydraulic piston cylinder assembly P.

Through actuation of hydraulic cylinder 310 the arms 301 and 302 may be moved effectively to open the jaw and thereby permit entry of a tree into the area designated 350. Movement of the arms 301 and 302 away from one another simultaneously therewith moves the gripping members 351 and 353 away from one another. When a tree has been placed in the area 350, actuation of hydraulic cylinder 310 closes the jaw placing the gripping members around the tree. Actuation at that point of hydraulic cylinder 377 moves the pairs of gripping members 351, 351A, 352, 352A and 353, 353A into gripping relation with the trunk of the tree. Thereafter, actuation of hydraulic cylinders 408, 409 and 410 may be effected moving the cutting assembly 400 in a direction vertically downwardly as viewed in FIG. 1, i.e. a direction away from the clamping and tree gripping device, the cutting edges 405 severing the tree trunk from its roots. After the trunk has been severed from its roots, the entire assembly may be raised through actuation of the extendible and retractable boom lifting the tree from its growing position and thereafter through suitable hydraulic controls not shown, the entire assembly is pivoted by the power unit P felling the tree to the ground.

The foregoing device is applicable not only for felling trees but also may be used to process trees by removing the limbs therefrom. The device in such instance may also be pivoted on the free end of an extendible and retractable boom and moved along the length of a tree trunk by movement of the vehicle and/or extension and retraction of the boom so as to move the cutting members longitudinally along the tree severing the branches in a stripping type delimbing operation. For severing heavy limbs the device may be used as described in the foregoing manner with respect to severing the roots utilizing the gripping members to clamp the tree in the grapple and thereafter actuate the hydraulic cylinders 408, 409 and 410 to move the cutting members relative to the grapple assembly to sever the limbs. This would provide an intermittent type of feed operation, the length of stroke being dependent upon the telescopic arrangement of shafts 369, 369A and 369B in their respective sleeves. After full extension of the respective shafts in their sleeves, it would be necessary to move the gripping device to another location on the tree trunk and repeat the step.

In an alternative arrangement, the foregoing device may be mounted on a mobile vehicle or similar frame and used as a processing assembly with feed devices associated therewith to propel a tree endwise through the opening 350. The size of the opening may be varied as described in the foregoing through suitable actuation of the hydraulic cylinder assemblies and as the tree is propelled through opening 350, cutting edges 405 remove the limbs from the tree. In such use of the device it may be mounted so that the opening for inserting trees may be either at the bottom, at the side or at the top, thus permitting various arrangements facilitating inserting trees into the device by opening the jaw provided by arms 301 and 302. In an arrangement of this type, feed rolls or other conveying mechanisms, all of which are well known, may be utilized. As an example reference may be had to Canadian Patent No. 860,080 issued Jan. 5, 1971 to Douglas D. Hamilton et al entitled "Modified Processor and components". In the arrangement disclosed therein the present device may be substituted for the stripper delimber and tree severing unit utilizing the tree propelling mechanism as a feed for the present device. Similarly, feed rolls of a circular type may be used to propel trees endwise through the present device and in this regard, reference may be had to the feed rolls disclosed in Canadian Patent No. 870,394 issued May 11, 1971 to Douglas D. Hamilton et al entitled "Tree feed means incorporating correlation of contact pressure and propelling forces". In such an arrangement the correlation of contact pressure and propelling forces may be optionally used.

The device described in the foregoing may also be used to strip the limbs of trees before felling the same. In such an arrangement the entire assembly may be attached to the free end of an extendible and retractable boom through a universal joint permitting rotating the entire assembly to an inverse position as shown in FIG. 1 placing the cutting device vertically above the grapple assembly. In such an arrangement the boom may be controlled from the vehicle to move the entire assembly vertically upwardly along the tree to strip the limbs therefrom and thereafter it may be utilized to fell the tree in a manner described in the foregoing.

It will also be evident that the arrangement as illustrated in FIG. 1 may be used to strip the limbs from trees by a vertical downward motion starting at the top of a tree and removing limbs as it is moved down the standing tree, movement of the device from the top of the tree to the bottom part being effected by control of the extendible and retractable boom. As the device reaches the bottom of the tree, the gripping mechanism may then be clamped onto the tree and actuation of the severing device as described in the foregoing will sever the roots from the standing tree.

I claim:

1. A device for cutting appendages projecting from the stem of a tree such as roots or the like comprising in combination:
   a. a frame;
   b. a grapple having arms movably mounted on said frame for positively gripping the stem of a tree; and
   c. a cutting device movably mounted on said grapple in spaced relation relative thereto for movement in a direction toward and away therefrom longitudinally along the stem of a tree grasped by said grapple, said cutting device having a cutting member connected to an arm of the grapple movably mounted on the frame for movement in unison therewith toward and away from the stem of the tree during grasping and releasing of the same by said grapple, said cutting member having a cutting edge facing longitudinally of the stem of the tree grasped by the grapple for severing appendages projecting outwardly from the stem of the tree.

2. A device as defined in claim 1 including gripping members movably mounted on said grapple arms.

3. A device as defined in claim 2 wherein said gripping members are pivotally mounted on said grapple arms for movement about an axis generally parallel to the longitudinal axis of the stem of a tree grasped by the grapple.

4. A device as defined in claim 3 including means synchronizing pivotal movement of the gripping members on the respective arms of the grapple.

5. A device as defined in claim 1 including a gripping member pivotally mounted on each of the arms of said grapple and a further gripping member pivotally mounted on said frame, said gripping members being arranged circumferentially in spaced relation relative to one another around a common area.

6. A device as defined in claim 5 including means synchronizing pivotal movement of said gripping members.

7. A gripping device as defined in claim 6 including power means for effecting pivotal movement of said gripping members.

8. A device as defined in claim 7 wherein each of said gripping members comprises a pair of members spaced longitudinally apart from one another and interconnected for pivotal movement in unison about a common axis.

9. A tree cutting device as defined in claim 1 wherein said grapple comprises a pair of arms pivotally mounted on said frame and including means pivotally mounting a cutting member on respective ones of said arms adjacent the free end thereof and means slidingly and guidingly mounting said cutting members for movement in a direction toward and away from the respective arm associated therewith.

10. A device as defined in claim 9 including a further cutting member pivotally and slidingly mounted on said frame.

11. A device for securing to the free end of an extendible and retractable boom for use in severing trees from their roots while the same are in a growing position comprising in combination:
   a. a frame;
   b. a grapple including at least one pair of arms forming a jaw, each of said arms being pivotally secured to said frame;
   c. a first and second tree gripping member pivotally secured to respective ones of said pair of arms;
   d. at least a third tree gripping member pivotally secured to said frame and arranged to co-operate with said first and second tree gripping members for gripping a tree;
   e. link means interconnecting said tree gripping members to move the same relative to one another and said frame;
   f. power means connected to said tree gripping members for moving the same relative to said frame;
   g. power means connected to said grapple for moving said arms thereby opening and closing said jaw;
   h. cutting means movably mounted on each of said tree gripping members and movable therewith relative to said frame, said cutting means being movable toward and away from said tree gripping members;
   i. power means for moving said cutting means relative to said tree gripping members; and
   j. means guiding said cutting means during movement thereof toward and away from said tree gripping means.

12. A device for securing to the free end of an extendible and retractable boom for use in severing trees from their roots while the tree is in a growing position comprising in combination:
   a. a frame;
   b. a grapple secured to said frame, said grapple including at least three tree gripping members each movably mounted on said frame for movement relative to one another, each of said members being movable toward and away from a common axis respectively to grip and release a tree therebetween;
   c. a tree severing device mounted on said grapple and disposed at a position spaced therefrom, said severing device including at least three cutting members, means movably mounting said cutting members for movement toward and away from said common axis; and
   d. power means for moving said tree gripping members and said cutting members relative to said tree.

13. A device as defined in claim 12 including means movably mounting said severing device for sliding movement toward and away from said grapple longitudinally along a tree gripped by said grapple.

14. A method of severing a tree from its roots while the tree is in a growing position comprising the steps of: positively gripping said tree by positioning grasping members of a grapple symmetrically about the periphery of the trunk of said tree to generally encircle the same, urging each of said grasping members toward said tree to grip the tree and in response thereto simultaneously in unison therewith positioning a plurality of cutting members symmetrically about and adjacent to the periphery of said trunk at a position between said grasping members and the roots of said tree; moving said cutting members in a direction away from said grapple longitudinally along said tree to sever the roots of the tree adjacent the trunk thereof.

15. A tree cutting device comprising in combination:
   a. a frame;
   b. a gripping device including arms movably mounted on said frame for movement from and toward one another respectively to receive a longitudinally extending object therebetween such as the stem of a tree, and positively grip the same;
   c. a cutting device including at least one cutting member mounted on an arm of said gripping device for movement with such arm and positioined adjacent the tree gripped by said arms, said cutting members having a cutting edge facing in a direction generally parallel to the length of the tree gripped by said arms;
   d. means mounting the cutting members on said arms for movement in a direction generally parallel to the length of the gripped tree and guiding the same during such movement; and
   e. power means interconnecting the cutting member and movably mounted arm associated therewith for moving the cutting member longitudinally along the tree gripped by said arms.

16. A tree cutting device as defined in claim 15 wherein said arms comprise two arms pivotally mounted on said frame to provide a grapple and power means operatively connected to effect pivotal movement of such arms.

17. A tree cutting device as defined in claim 15 wherein said cutting members and the cutting edges thereof extend in an arc about the circumference of a tree grasped by said arms.

18. A device for securing to the free end of an extendible and retractable boom for use in severing trees from their roots while the same are in a growing position comprising in combination:
   a. a frame;
   b. a grapple including at least one pair of arms forming a jaw, each of said arms being pivotally attached to said frame;
   c. a first and second tree gripping member pivotally attached to respective ones of said pair of arms;
   d. a third tree gripping member pivotally attached to said frame and arranged to co-operate with said first and second tree gripping members for gripping a tree;
   e. link means interconnecting said tree gripping members synchronizing pivotal movement of the same;
   f. power means connected to said tree gripping members for pivotally moving the same on said frame;

g. power means connected to said grapple for moving said arms to open and close the jaw provided by such arms respectively to receive and grasp the stem of a tree;

h. cutting means connected to respective ones of said tree gripping members for movement in unison therewith during opening and closing of the grapple jaw, and means mounting the same thereon for guided reciprocal movement toward and away from said tree gripping members; and i. power means connected to said cutting means for moving the same toward and away from said tree gripping members.

19. A device for securing to the free end of an extendible and retractable boom for use in severing trees from their roots while the tree is in a growing position comprising in combination:

a. a frame;

b. a grapple secured to said frame, said grapple including two or more tree gripping members movably mounted on said frame for movement toward and away from one another respectively to grip and release the stem of a tree therebetween;

c. a cutting device movably mounted on said grapple and disposed at a position spaced therefrom, said cutting device comprising a cutting member reciprocally mounted on respective ones of said gripping members for movement longitudinally along the stem of a tree gripped by said gripping members;

d. power means connected to said gripping members for moving the same to receive and grip the stem of a tree; and e. power means connected to said cutting members for moving the same toward and away from the gripping member associated therewith.

* * * * *